United States Patent [19]

Nishimura

[11] Patent Number: 5,314,053
[45] Date of Patent: May 24, 1994

[54] TORQUE TRANSMISSION DEVICE

[75] Inventor: Kohzoh Nishimura, Akashi, Japan

[73] Assignee: Mita Industrial Co., Ltd., Osaka, Japan

[21] Appl. No.: 983,485

[22] Filed: Nov. 30, 1992

[30] Foreign Application Priority Data

Dec. 5, 1991 [JP] Japan .................................. 3-321918

[51] Int. Cl.$^5$ ............................................. F16D 13/12
[52] U.S. Cl. .................................... 192/41 S; 192/76; 192/81 C; 192/84 T; 403/383
[58] Field of Search .................. 192/41 S, 74, 75, 76, 192/81 C, 84 T, 33 C; 403/383, 359

[56] References Cited

U.S. PATENT DOCUMENTS

| | | | |
|---|---|---|---|
| 5,052,842 | 10/1991 | Janatka | 403/359 X |
| 5,090,358 | 2/1992 | Osawa | 192/81 C X |
| 5,135,086 | 8/1992 | Ciolli | 192/41 S |
| 5,148,718 | 9/1992 | Kakuguchi et al. | 403/383 X |

Primary Examiner—Leslie A. Braun
Assistant Examiner—Andrea Pitts
Attorney, Agent, or Firm—Jordan and Hamburg

[57] ABSTRACT

A torque transmission device includes an input shaft, an output shaft, a helical spring, a fixing member, and a stopping member. The helical spring has an input portion frictionally connected to the input shaft and an output portion frictionally connected to the output shaft, and rotatable together with the input shaft and the output shaft to transmit the torque of the input shaft to the output shaft. The stopping member is engageable with an input end portion of the spring at a predetermined engaging position and adapted for stopping the output shaft at a predetermined rotational position. The fixing member is used to fix an output end portion of the spring on the output shaft at such a position as to assure a predetermined phase relationship between the engaging position and the rotational position.

8 Claims, 6 Drawing Sheets

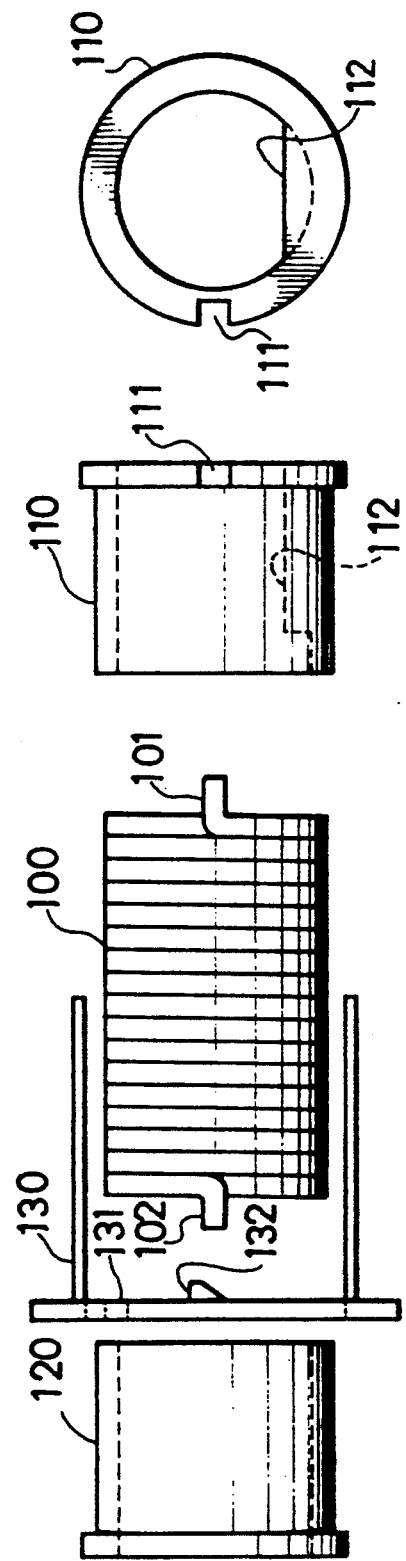

TORQUE TRANSMISSION DEVICE

BACKGROUND OF THE INVENTION AND RELATED ART STATEMENT

This invention relates to a torque transmission device capable of intermittently switching torque transmission between an input rotary member and an output rotary member to rotate and stop the output rotary member at a specified rotational position.

In copying machines in which document images are copied on copy sheets, it has been known to be necessary to feed sheets intermittently at specified intervals when a variety of processings are applied to the sheets being transported. Feed rollers have been generally used to feed the sheets intermittently. A pair of feed rollers are arranged opposed to each other. Sheets inserted manually or transported by another feeding means from an upstream side are introduced to a nip between the roller pair and are fed to a downstream side one by one, and a desired processing is applied to the sheets at the downstream side. In this case, in order to feed the sheets by means of the feed rollers reliably, the feed rollers are caused to stop at specified rotational positions, and the sheet is inserted into the nip between the pair of feed rollers while rotation of the feed rollers is suspended. After the sheet is completely inserted into the nip, the feed rollers are drivingly rotated by means of a manual operation or upon automatically detecting the insertion of the sheet, so that the sheet can be fed to the downstream side reliably. Since the feed rollers are rotated and stopped at the specified positions alternately in this way, there is normally employed a spring clutch structure for transmitting on and off a torque to a rotary shaft of the feed rollers.

FIGS. 6A and 6B show a construction of an exemplary spring clutch. FIG. 6A is an exploded front view showing a mounting relationship of basic components of the spring clutch including a helical spring 100, a coupler 120 fixedly attached to an input shaft (driving side), a coupler 110 fixedly attached to an output shaft (feed roller side), and a collar 130. FIG. 6B is a side view of the coupler 110 when viewed from the right side.

The helical spring 100 has a specified inside diameter in a free state (i.e. in a state where no force is acting on the helical spring 100), and has an output end portion 101 and an input end portion 102 bent in axial directions thereof so as to serve as engaging portions respectively. Normally, the helical spring 100 is fabricated such that the phase of the output end portion 101 coincides with that of the input end portion 102 before they are placed on respective outer circumferential surfaces of the couplers 110 and 120. The couplers 110, 120 are designed such that the outside diameters thereof are at least slightly larger than the inside diameter of the helical spring 100. The helical spring 100 has one side portion thereof pressingly fitted on an outer circumferential surface of the coupler 110 and has the other side portion pressingly fitted on an outer circumferential surface of the coupler 120. On an output end of the coupler 110 and an input end of the collar 130 are provided flanges having a large diameter. The collar 130 is rotatable on the coupler 120. In the flange of the coupler 110 is formed a groove 111 in which the output end portion 101 of the helical spring 100 is fitted. Likewise, in the flange of the collar 130 is formed a hole (or groove) 131 in which the input end portion 102 of the helical spring 100 is fitted. By fitting the output and input end portions 101. 102 in the groove 111 and the hole 131 respectively, the collar 130 and the helical spring 100 are prevented from idly rotating. The coupler 110 is formed with a D-shaped hollow having a fitting surface 112 as shown in FIG. 6B. To the fitting surface 112 is fitted an unillustrated rotary shaft of the feed roller (a mating portion of the rotary shaft has at least a similar D-shaped cross-section), thus enabling the coupler 110 and the unillustrated rotary shaft of the feed roller to rotate integrally. Indicated at 132 is a projection formed at a specified position on the flange of the collar 130. When the projection 132 is in a specified rotational position, the spring clutch is caused to be disengaged. More specifically, the projection 132 comes into contact with an unillustrated stopping member, and a force acts in a direction opposite to a winding direction of the helical spring 100. As a result, the helical spring 100 is loosened radially and only the coupler 120 rotates with sliding on the inside surface of the spring 100. Consequently, the clutch is disengaged and the transmission of the torque from the coupler 120 to the coupler 110 is interrupted. In this way, the feed roller is controllably caused to rotate and stop at the specified rotational position.

As described above, the feed roller can be stopped at the specified rotational position when an angular position of the collar 130 whose rotation is regulated by the combination of the projection 132 and the stopping member is held in specific corresponding relation to the phase of the feed roller mounted on the rotary shaft fitted to the fitting surface 112 of the coupler 110. Thereby, the sheets can be inserted into the nip between the stationary feed roller pairs reliably.

The phase relationship between the input end portion 102 of the helical spring 100 and the fitting surface 112 of the coupler 110 is determined by the phase relationship between the input end portion 102 and output end portion 101 of the helical spring 100. However, the phase relationship between both end portions 101, 102 is not in a fixed relationship and is liable to change with springs and couplers. Accordingly, the phase relationship between the input end portion 102 and the fitting surface 112 is not fixed. Consequently, it is difficult to control stopping of the rotary shaft fitted on the coupler 110 at a specified rotational position.

More specifically, the output and input end portions 101, 102 of the helical spring 100 have a specific phase relationship (for example, they are in the same phase in FIG. 6A) until the helical spring 100 is mounted on the couplers 110 and 120. However, since the outside diameters of the couplers 110, 120 are set slightly larger than the inside diameter of the helical spring 100, the diameter of the helical spring 100 is increased when the helical spring 100 is mounted on the couplers 110 and 120. Accordingly, the phase relationship between the output and input end portions 101, 102 changes with changes in the fitting or mating lengths of the helical spring 100 and the couplers 110 and 120. In FIG. 6A, for example, when the input end portion 102 is fitted in the hole 131, the collar 130 rotates, and the projection 132 consequently shifts. It should be noted that production of couplers and springs involve dimensional variations for various reasons. Accordingly, the phase relationship between the input end portion 102 and the output end portion 101 differs in individual products due to the dimensional variations. Thus, it will be impossible to assure a fixed phase relationship between the input end portion 102 and the fitting surface 112 of the coupler 110, and to then stop the output shaft or the feed roller at a specified rotational position.

SUMMARY OF THE INVENTION

It is an object of the present invention to provide a torque transmission device which has overcome the abovementioned drawbacks.

Accordingly, a torque transmission device of the invention comprises an input shaft, an output shaft, transmission means, fixing means, and stopping means. The transmission means includes an input portion frictionally connected to the input shaft and an output portion frictionally connected to the output shaft, the transmission means being rotatable together with the input shaft and the output shaft to transmit the torque of the input shaft to the output shaft. The transmission means further includes an input end portion and an output end portion. The fixing means is adapted for fixing the output end portion of the transmission means on an appropriate position of the output shaft. The stopping means is engageable with the input end portion of the transmission means at a predetermined engaging position and adapted for stopping the output shaft at a predetermined rotational position.

With the thus constructed device, a phase relationship between the engaging position of the input end portion of the transmission means and the predetermined rotational position of the output shaft is adjusted by fixing the output end portion of the transmission means on a desired position of the output shaft with the use of the fixing means. Accordingly, the phasic relationship between the input end portion of the transmission means and the rotational position of the output shaft can be adjusted with ease without receiving the influence of dimensional variations.

Also, the fixing means includes a ring fixedly fittable on an outside surface of the output shaft. The ring is formed with a recess for holding the output end portion of the transmission means. Also, the output shaft is formed with a tapered surface. This can make it easier to fix the output end portion of the transmission means on the output shaft at the appropriate position.

Further, the transmission means is a helical spring. The helical spring is fitted on respective outside surfaces of the input shaft and output shaft. This construction facilitates fitting of the helical spring on the input and output shafts while observing a fitting depth of the helical spring.

Further, the stopping means is a collar which is placeable around the helical spring, and has a notch engageable with the input end portion of the helical spring, and has a stopping projection at a circumference of the collar. This construction makes more reliable stopping of the output shaft at a specified position.

Furthermore, the output shaft is formed with a D-shaped hollow. This facilitates adjustment of the relationship between the input end portion of the transmission means and the rotational position of the output shaft.

These and other objects, features and advantages of the present invention will become more apparent upon a reading of the following detailed description and accompanying drawings.

BRIEF DESCRIPTION OF THE DRAWINGS

FIG. 5B being a left side view of the pivotal plate, and FIG. 5C being a front view of the pivotal plate; and FIGS. 6A and 6B show a construction of a conventional torque transmission device, FIG. 6A being an exploded front view showing a mounting relationship of basic components of the conventional torque transmission device and FIG. 6B being a right side view showing a coupler incorporated in the conventional torque transmission device.

DETAILED DESCRIPTION OF PREFERRED EMBODIMENTS OF THE INVENTION

Figure 1:
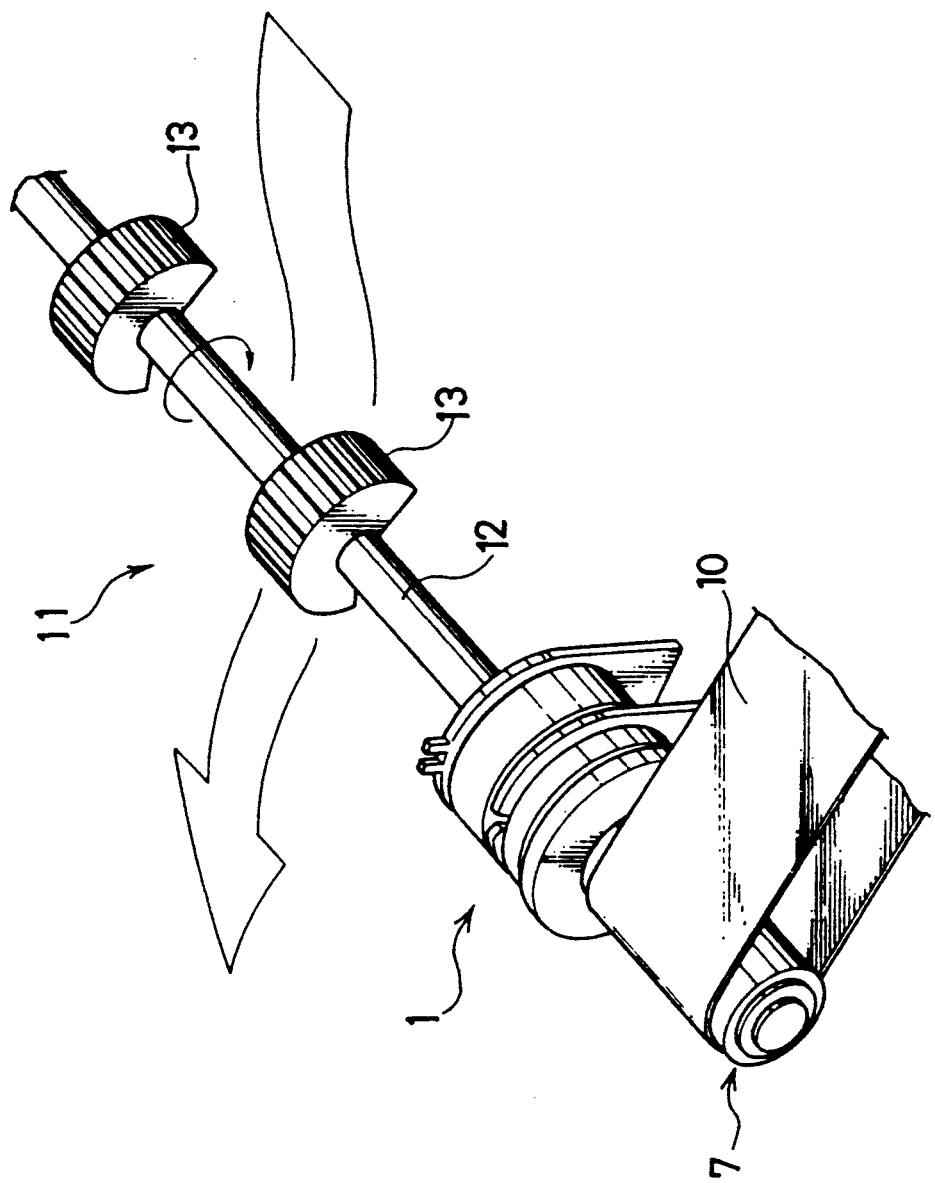
FIG. 1 is a perspective view showing a schematic construction of an exemplary feed roller unit of a copying machine incorporating a torque transmission device embodying the invention.

FIG. 1 is a perspective view showing a schematic construction of an exemplary feed roller unit provided in a copying machine or like apparatus incorporating a torque transmission device according to the invention.

In this figure, a feed roller unit 11 includes a rotary shaft 12, and feed rollers 13 fixedly mounted on the shaft 12 which are spaced apart by a specified distance. These feed rollers 13 are formed of material having a desired frictional force such as rubber, so that the outer circumferential surfaces thereof can feed sheets reliably. Further, the rollers 13 have cut away portions having a fanlike cross-section cut, the cut away portions being in the same phase. The rotary shaft 12 has opposite ends thereof supported on side walls of an unillustrated apparatus. At one end of the rotary shaft 12 is provided a torque transmission device 1 including a spring clutch, an electromagnetic solenoid, etc. On a timing pulley 7 constituting in part the torque transmission device 1 is wound an endless belt 10 which is stretched between the pulley 7 and an unillustrated main motor. Therefore, the torque from the main motor is transmitted to the rotary shaft 12 by way of the endless belt 10 and the torque transmission device 1. The unillustrated motor is caused to rotate continuously so as to transmit the torque thereof to torque requiring components of the copying machine while the copying machine is in operation. Below each feed roller 13 is disposed, as well-known, a driven roller or the like which is in opposing contact with the feed roller 13 so as to feed the sheet held between the feed roller 13 and the driven roller.

In this feeding mechanism, a sheet of paper is inserted below the feed rollers 13 from the right in the drawing of FIG. 1 by manual insertion, for example. Thereafter, the spring clutch (see FIG. 2) of the torque transmission device 1 is engaged by means of a manual operation or upon automatically detecting the insertion of the sheet, thereby causing the rotary shaft 12 to rotate. According to the rotation of the shaft 12, the inserted sheet is fed in a direction indicated by a large arrow in FIG. 1. When the sheet is inserted, the clutch is disengaged and the feed rollers 13 are stopped at specified rotational positions or predetermined positions where the rollers 13 have the cut away portions thereof faced downward. Accordingly, the sheet can be inserted easily. Each time the feed of the sheet is completed, the feed rollers 13 are caused to stop at the specified rotational position by the torque transmission device 1. When a next sheet is inserted, the clutch is engaged again to start the rotation of the feed rollers 13, and thereby the inserted sheet can be fed to a downstream side reliably.

Figure 2:
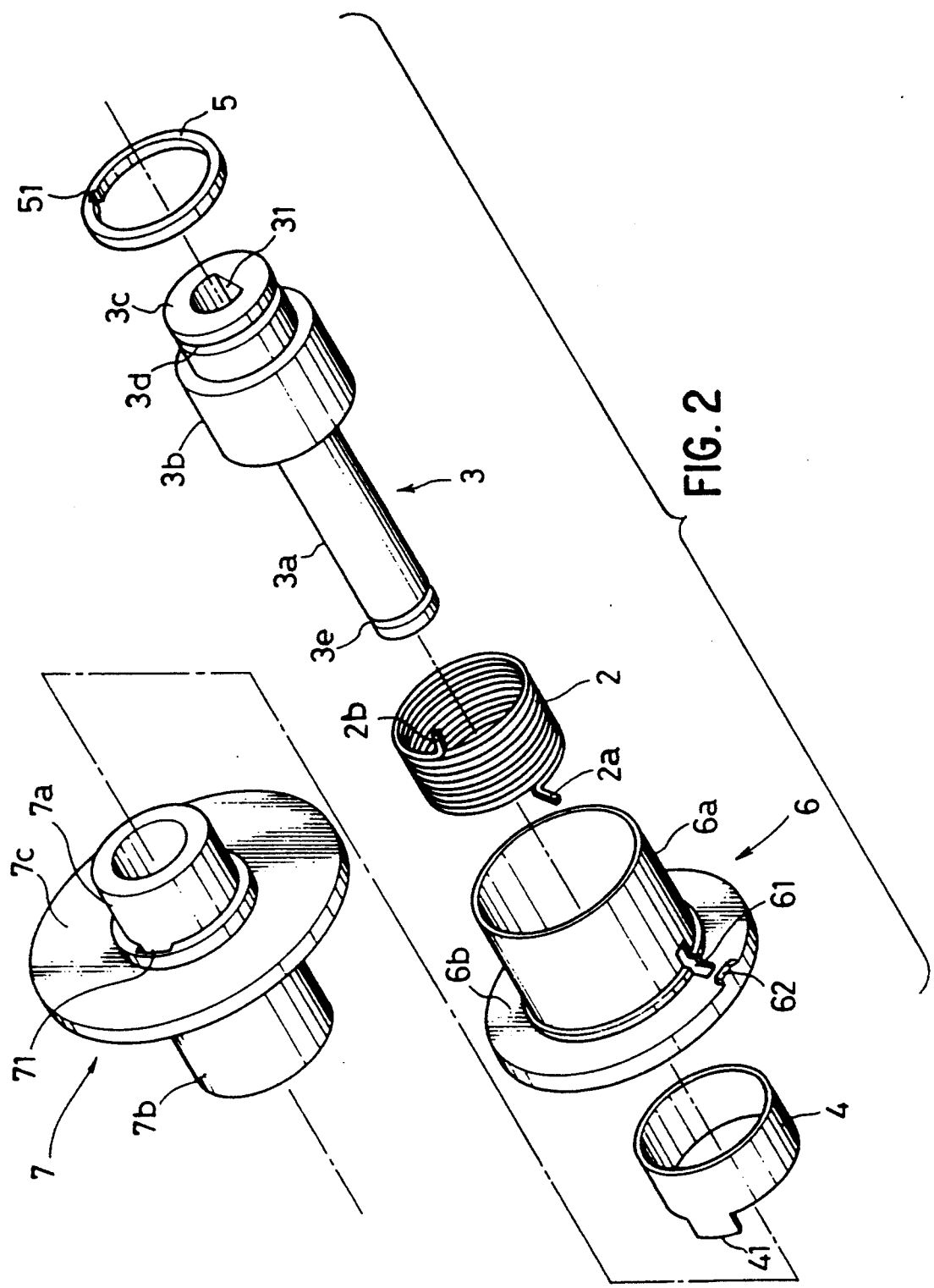
FIG. 2 is an exploded perspective view showing a construction of a main portion of the torque transmission device.

FIG. 2 is an exploded perspective view showing a construction of a spring clutch of the torque transmission device for the feed rollers.

This spring clutch includes a helical spring 2, a shaft (output shaft) 3, a hub 4, a ring member 5, a collar 6, and the timing pulley (input shaft) 7. It will be noted that all the components of the spring clutch except the helical spring 2 and the hub 4 are formed of, for example, resin. The timing pulley 7 and the hub 4 constitute an input portion of the torque transmission device while the shaft 3 constitutes an output portion of the torque transmission device.

The helical spring 2 has a specified inside diameter and a specified axial dimension in a free state. An input end portion 2a of the helical spring 2 is bent in a radial direction, whereas an output end portion 2b thereof is bent in an axial direction. An output half of the helical spring 2 is pressingly fitted on an outer circumferential surface of a large cylindrical portion 3b of the shaft 3 with a small cylindrical portion 3a inserted therein, whereas an input half thereof is pressingly fitted on an outer circumferential surface of the hub 4.

The shaft 3 consists essentially of cylindrical portions, namely the small cylindrical portion 3a, the large cylindrical portion 3b, and a medium cylindrical portion 3c arranged in this order from an inputting end thereof. The outside diameter of the large cylindrical portion 3b is set slightly larger than the inside diameter of the helical spring 2, such that the helical spring 2 will not idly rotate when it is externally fitted on the large cylindrical portion 3b without being applied with any external force. In the medium cylindrical portion 3c is formed a hollow, namely a restricting portion 31, having a D-shaped cross-section when viewed from the axial direction. In place of the D-shaped hollow, the medium cylindrical portion 3c may be cut along a plane so as to define a D-shaped cut away portion. The shape of the restricting portion 31 is not limited to those which will actively prevent the idle rotation, but also includes those which are able to maintain a coupling state of the shaft 3 and the rotary shaft 12.

The outside diameter of the hub 4 is set slightly larger than the inside diameter of the helical spring 2 similar to the large cylindrical portion 3b, such that the helical spring 2 is not idly rotated in a state where it is externally fitted on the hub 4 without being applied with any external force. Indicated at 41 is a projected portion projecting from a portion of the input end of the hub 4 in the axial direction by a given distance. The hub 4 is formed of, for example, an alloy which is obtained by sintering a ferrous metal. In grooves 3d, 3e formed in the surface of opposite ends of the shaft 3 are fitted snap rings 9 (see FIG. 3B) to hold respective components of the torque transmission device 1.

The ring member 5 is pressingly fitted on the large cylindrical portion 3b of the shaft 3, and has a groove 51 formed at a specified position in an inner circumferential surface thereof. To the groove 51 is fitted the output end portion 2b of the helical spring 2, and thereby the ring member 5 is engaged with the helical spring 2. If a right portion of the large cylindrical portion 3b is slightly tapered toward the output end thereof, the ring member 5 can be fitted on the large cylindrical portion 3b easily.

The timing pulley 7 includes a hollow cylindrical portion 7a, a boss 7b on which the endless belt 10 is wound, and a flange portion 7c having a large diameter. The hub 4 is fitted on an outer circumferential surface of the cylindrical portion 7a. The small cylindrical portion 3a of the shaft 3 is inserted loosely in the hollow of the cylindrical portion 7a. The flange portion 7b is adapted for preventing the endless belt 10 from escaping from the boss 7b. At a stepped portion between the cylindrical portion 7a and the flange portion 7c is formed a hole 71 to which the projected portion 41 of the hub 4 is fitted. In a state where the projected portion 41 is fitted in the hole 71, the hub 4 and the timing pulley 7 are permitted to rotate integrally with each other. Although only one each of the projected portion 41 and the hole 71 are illustrated in FIG. 2, another projected portion and another hole are formed at positions circumferentially spaced therefrom by 180°. This functions to prevent the hub 4 and the timing pulley 7 from disengaging from each other more reliably.

The collar 6 includes a hollow cylindrical portion 6a and a flange portion 6b having a large diameter. The cylindrical portion 6a has an axial dimension substantially equal to that of the helical spring 2, and an inside diameter thereof is set slightly larger than the outside diameter of the helical spring 2 in the state where the spring 2 is externally fitted on the large cylindrical portion 3b and the hub 4. At a stepped portion formed between the cylindrical portion 6a and the flange portion 6b is defined a notch 61 which is engageable with the input end portion 2a of the helical spring 2. The helical spring 2 and the collar 6 are permitted to rotate integrally with each other by engaging the input end portion 2a of the helical spring 2 with the notch 61. At a specified position on an outer circumferential surface of the flange portion 6b of the collar 6 is formed a stopping projection 62.

An electromagnetic solenoid 8 to be described later is provided around the collar 6. The stopping projection 62 comes into contact with a pivotal plate 85 serving as a restricting member which is provided in the electromagnetic solenoid 8.

Assembling of the aforementioned torque transmission device will be described below.

The hub 4 is fitted and mounted on the timing pulley 7 in advance. The input half of the helical spring 2 is expanded radially forcibly so as to be fitted on the outer circumferential surface of the hub 4 mounted on the timing pulley 7. Subsequently, the collar 6 is externally placed over the helical spring 2 fitted on the hub 4 from the output end side of the helical spring 2, and the input end portion 2a of the helical spring 2 is fitted and engaged with the notch 61. Thus, the helical spring 2 and the collar 6 are made rotatable integrally with each other. Then, the shaft 3 is inserted inside the helical spring 2 from the output end portion 2b of the helical spring 2. At this time, the remaining half of the helical spring 2 is expanded radially forcibly so as to be fitted on the outer circumferential surface of the large cylindrical portion 3b while maintaining a predetermined phase relationship between the stopping projection 62 and the restricting portion 31.

When the helical spring 2 is fitted on both the hub 4 and the large cylindrical portion 3b of the shaft 3, the phase of the input end portion 2a is shifted from that of the output end portion 2b. In view of this, the ring member 5 is fitted from the medium cylindrical portion 3c. At this time, the ring member 5 is tightly fitted on the large cylindrical portion 3b in such a manner that the phase position of the groove 51 of the ring member 5 coincides with the phase position of the input end portion 2a of the helical spring 2, and the output end portion 2b is fitted in the groove 51. As a result, the phase relationship between the stopping projection 62 and the restricting portion 31 is fixed at the predetermined phasic relationship. This assembling can be carried out manually, or using such a device as to facilitate the assembling while maintaining the aforementioned phasic relationship.

Figure 3C:
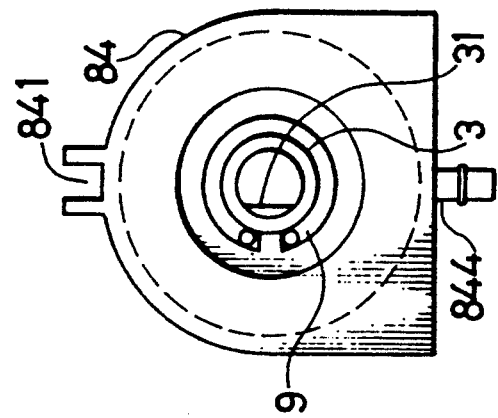
FIGS. 3A, 3B, and 3C are views showing an entire construction of the torque transmission device, FIG. 3A being a left side view of the torque transmission device, FIG. 3B being a front view in section of the torque transmission device, and FIG. 3C being a right side view of the torque transmission device.
Figure 3B:
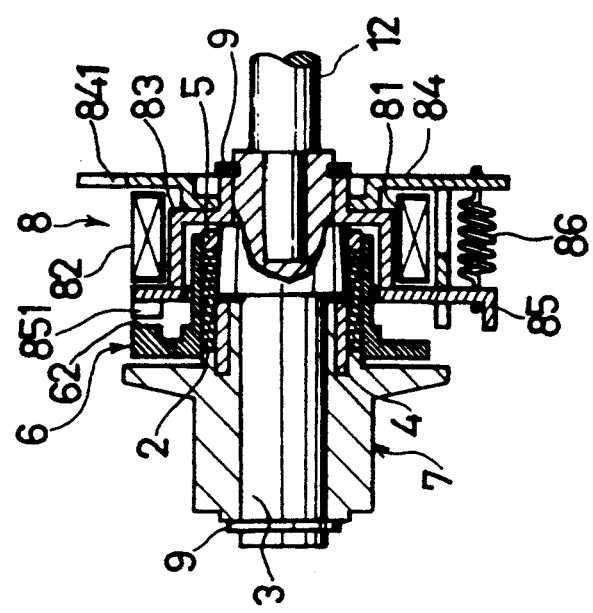
Figure 3A:
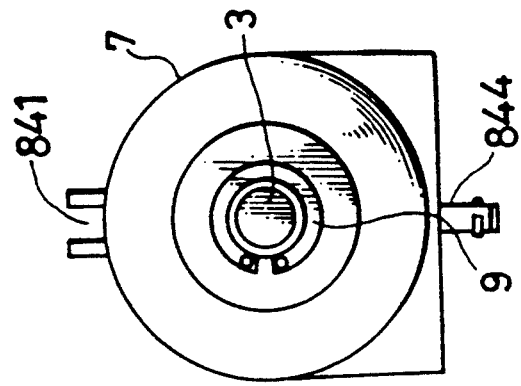

FIGS. 3A, 3B, and 3C are views showing an entire construction of the torque transmission device including the spring clutch and the electromagnetic solenoid, FIG. 3A being a left side view, FIG. 3B being a front view in section, and FIG. 3C being a right side view. It will be appreciated that like reference numerals denote like parts of components in FIGS. 2 and 3A, 3B, and 3C.

Indicated at 8 is the electromagnetic solenoid including a coil bobbin 81, a coil 82 wound around the coil bobbin 81, a coupler 83 formed of magnetic material, a solenoid frame 84 formed of magnetic material, the pivotal plate 85 formed of the magnetic material, and a spring 86.

In the coupler 83 of the electromagnetic solenoid 8 is loosely fitted the medium cylindrical portion 3c of the shaft 3, and thereby the solenoid 8 is arranged coaxially between the spring clutch and the feed roller unit 11. By fitting the rotary shaft 12 in the restricting portion 31 of the shaft 3, the stopping projection 62 and the feed rollers 13 are fixed to have a corresponding phase relationship. The coil bobbin 81 is fixed on an outer circumferential surface of the coupler 83, which is meshed integrally with the solenoid frame 84 at the right side in the drawing of FIG. 3B. At the opposite side of the coupler 83, the pivotal plate 85 is pivotally supported by the solenoid frame 84 to be described later.

Figure 4A:
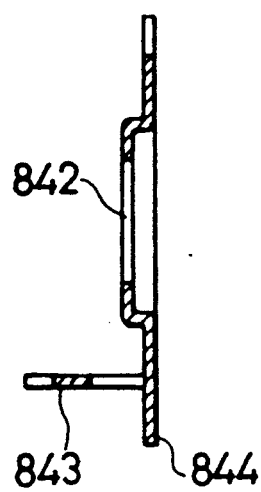
FIGS. 4A, 4B, and 4C are views showing a construction of a solenoid frame of the torque transmission device, FIG. 4A being a front view in section of the solenoid frame, FIG. 4B being a left side view of the solenoid frame, and FIG. 4C being a bottom view of the solenoid frame.
Figure 4B:
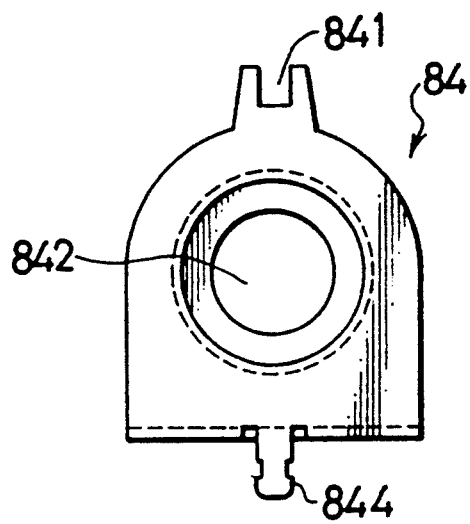
Figure 4C:
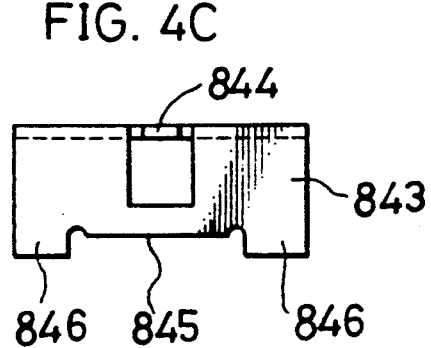

FIGS. 4A, 4B, and 4C are views showing a construction of the solenoid frame, FIG. 4A being a front view in section, FIG. 4B being a right side view, and FIG. 4C being a bottom view.

At the top of the solenoid frame 84 is formed a notch 841 to which an unillustrated rotation restricting member provided on a feeder or a copying machine main body is to be fitted. Accordingly, the electromagnetic solenoid 8 is not rotated together with the timing pulley 7 on the driving source side or input side. Indicated at 842 is a hole in which the shaft 3 is loosely fitted. Indicated at 843 is a horizontal plate portion extending horizontally from a lower end of the solenoid frame 84. Indicated at 844 is a spring holding portion 844 extending downward from the lower end of the solenoid frame 84. On a lower end of the spring holding portion 844 is held one end of the spring 86. In a forward end portion of the horizontal plate portion 843 is defined a notch 845, thereby forming arm portions 846 on opposite sides thereof to pivotally support the pivotal plate 85 as described later.

Figure 5A:
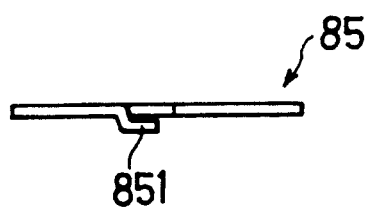
FIGS. 5A, 5B, and 5C are views showing a construction of a pivotal plate of the torque transmission device, FIG. 5A being a plan view of the pivotal plate.
Figure 5B:
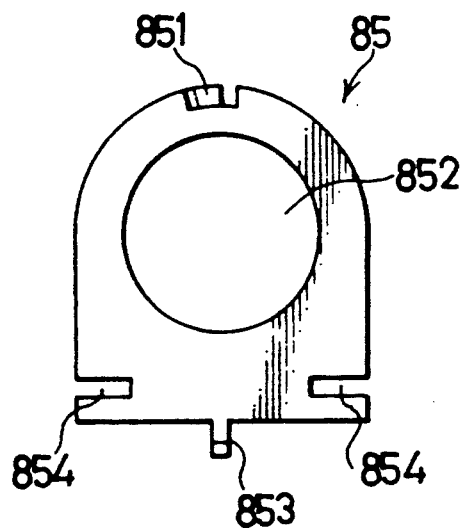
Figure 5C:
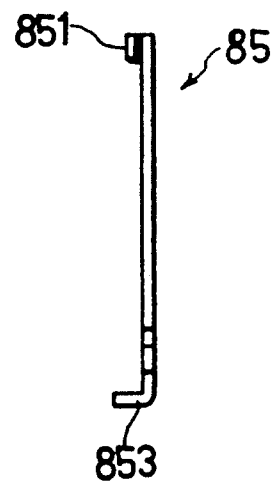

FIGS. 5A, 5B, and 5C are views showing a construction of the pivotal plate, FIG. 5A being a plan view, FIG. 5B being a left side view, and FIG. 5C being a front view.

A restricting projection 851 is formed on the surface of a top portion of the pivotal plate 85 facing the spring clutch. In the assembled torque transmission device 1, this restricting member 851 is positioned so that it will come into contact with the stopping projection 62 of the collar 6 when the collar 6 is rotated. Indicated at 852 is a hole in which the shaft 3 is loosely fitted. At the bottom of the pivotal plate 85 is formed a spring holding portion 853 extending downward so as to correspond to the spring holding portion 844 of the solenoid frame 84. The other end of the spring 86 is attached on the spring holding portion 853. Further, the pivotal plate 85 has opposite sides thereof partially cut away at positions symmetrical with respect to a vertical center line thereof to form notches 854 into which the arm portions 846 are to be inserted. Consequently, the pivotal plate 85 is supported by the arm portions 846 of the solenoid frame 84 and pivotable about a rear wall of the notch 845 of the solenoid frame 84.

Normally, the pivotal plate 85 is held in such a posture that the lower portion thereof is located closer to the solenoid frame 84 than the upper portion thereof due to a compressive biasing force of the spring 86, i.e. the pivotal plate 85 is inclined slightly toward the collar 6. On the other hand, when the electromagnetic solenoid 8 is energized, the pivotal plate 85 is attracted to the magnetic coupler 83 and held in an upright posture during an energization period.

An operation relationship between the torque transmission device 1 and the feed roller unit 11 will be described later.

The torque of the unillustrated main motor is transmitted through the endless belt 10 to the timing pulley 7, thereby rotating the same constantly.

When the electromagnetic solenoid 8 is energized and the pivotal plate 85 is attracted to the magnetic coupler 83, the restricting projection 851 is moved out of a rotation track of the stopping projection 62 of the collar 6. Accordingly, the shaft 3 starts rotating together with the timing pulley 7 through the helical spring 2. Thereupon, the rotary shaft 12 and the feed rollers 13 connected with the shaft 3 start rotating, thereby feeding the inserted sheet in the direction indicated by the large arrow in FIG. 1. On the other hand, the electromagnetic solenoid 8 is deenergized at least when the stopping projection 62 passes the position of the restricting projection 851, and thereby the restricting projection 851 is positioned on the rotation track of the stopping projection 62 by the biasing force of the spring 86.

Thereafter, when the feed rollers 13 make one turn, i.e. the stopping projection 62 comes to contact with the restricting projection 851, the rotation of the input end portion 2a of the helical spring 2 is restricted, thereby generating a force acting in a direction opposite to the winding direction of the helical spring 2. As a result, the helical spring 2 is loosened radially, and only the hub 4 rotates with sliding on the spring 2. Accordingly, the torque of the timing pulley 7 is not transmitted to the shaft 3, and the rotary shaft 12 provided with the feed rollers 13 is then stopped at the phase positions shown in FIG. 1. In this state, the next sheet is inserted properly to the feed roller unit 11.

The foregoing embodiment is described with respect to an example in which a single stopping projection 62 is provided. However, in relation to an apparatus to which the invention is applied, the phase position and the stop position of a rotary member may be controlled by providing another stopping projection at a position circumferentially spaced apart from the stopping projection 62 by 180° or by providing a plurality of stopping projections circumferentially spaced apart at a given spacing. Further, in the foregoing embodiment, the ring member 5 is pressingly fitted on the large cylindrical portion 3b of the shaft 3. However, the ring member 5 may be adhered on the outer circumferential surface of the large cylindrical portion 3b. Alternatively, a ring member 5 having an internal thread formed in the inner circumferential surface thereof is spirally fitted to a large cylindrical portion 3b having an external thread formed in the outer circumferential surface thereof to be fixed at a specified phase position. Moreover, the helical spring 2 may be pressingly inserted in the hub 4 and the large cylindrical portion 3b of the shaft 3 so that the outer circumferential surface thereof is in pressing contact with the respective inner circumferential surfaces of the hub 4 and the large cylindrical portion 3b.

Further, the invention is not limited in its application to the feed roller unit 11 as shown in the foregoing embodiment. This invention is also applicable to other roller units such as a separating roller unit including a separating roller having a semicircular cross-section and a driven roller in which the separating roller is controlled to stop at a specified position and to rotate by a predetermined amount each time a sheet is fed thereto.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A torque transmission device comprising:
   an input shaft;
   an output shaft;
   transmission means having an input portion frictionally connected to the input shaft and an output portion frictionally connected to the output shaft, the transmission means being rotatable together with the input shaft and the output shaft to transmit the torque of the input shaft to the output shaft, the transmission means further having an input end portion and an output end portion;
   fixing means for fixing the output end portion of the transmission means on the output shaft, the fixing means being selectively placeable in either a free state in which said fixing means freely rotates over an outside surface of the output shaft in a circumferential direction thereof or a fixed state in which said fixing means is fixedly fitted on the outside surface of the output shaft;
   stopping means, operable to be engageable with the input end portion of the transmission means at a predetermined engaging position, for halting the rotation of the transmission means so as to stop the output shaft at a predetermined rotational position, and to allow the input shaft to idly rotate to interrupt the transmission of torque from the input shaft to the output shaft; and
   a desired phase relationship between the engaging position of the input end portion of the transmission means and the predetermined rotational position of the output shaft being adjusted by fixing the output end portion of the transmission means on a desired position of the output shaft with the fixing means.

2. A torque transmission device as defined in claim 1 wherein the fixing means includes a ring fixedly fittable on an outside surface of the output shaft, the ring having a recess for holding the output end portion of the transmission means.

3. A torque transmission device as defined in claim 2 wherein the ring has a first inside diameter, and the output shaft includes a tapered periphery having a smaller outside diameter smaller than the first diameter and a larger diameter larger than the first diameter.

4. A torque transmission device as defined in claim 1 wherein the transmission means includes a helical spring.

5. A torque transmission device as defined in claim 4 wherein an inside surface of an input portion of the helical spring is in a frictional contact with an outside surface of the input shaft, and an inside surface of an output portion of the helical spring is in a frictional contact with an outside surface of the output shaft.

6. A torque transmission device as defined in claim 4 wherein the stopping means includes a collar placed around the helical spring, having a notch engageable with the input end portion of the helical spring, and having a stopping projection at a circumference of the collar.

7. A torque transmission device as defined in claim 1 wherein the output shaft is hollow having a D-shaped cross-section.

8. A torque transmission device comprising:
   an input shaft;
   an output shaft;
   transmission means having an input portion frictionally connected to the input shaft and an output portion frictionally connected to the output shaft, the transmission means being rotatable together with the input shaft and the output shaft to transmit the torque of the input shaft to the output shaft, the transmission means further having an input end portion and an output end portion;
   fixing means for fixing the output end portion of the transmission means on the output shaft, the fixing means including a ring fixedly fittable on an outside surface of the output shaft, said ring having a recess for holding the output end portion of the transmission means, and the ring having a first inside diameter, and the output shaft including a tapered periphery having a smaller outside diameter smaller than the first inside diameter and a larger diameter larger than the first inside diameter;
   stopping means, operable to be engageable with the input end portion of the transmission means at a predetermined engaging position, for halting the rotation of the transmission means so as to stop the output shaft at a predetermined rotational position, and to allow the input shaft to idly rotate to interrupt the transmission of torque from the input shaft to the output shaft; and
   a phase relationship between the engaging position of the input end portion of the transmission means and the predetermined rotational position of the output shaft being adjusted by fixing the output end portion of the transmission means on a desired position of the output shaft with the fixing means.

* * * * *